United States Patent [19]

Thijssen

[11] 4,265,920

[45] May 5, 1981

[54] PROCESS FOR CONCENTRATION OF ALCOHOLIC BEVERAGES

[75] Inventor: Henricus A. C. Thijssen, Son, Netherlands

[73] Assignee: Douwe Egberts Koninklijke Tabaksfabriek, Koffiebranderijen en Theehandel B.V., Utrecht, Netherlands

[21] Appl. No.: 80,776

[22] Filed: Sep. 28, 1979

Related U.S. Application Data

[63] Continuation of Ser. No. 885,347, Mar. 10, 1978, abandoned.

[30] Foreign Application Priority Data

Mar. 19, 1977 [GB] United Kingdom ............... 11713/77

[51] Int. Cl.$^3$ ........................ C12G 3/08; C12G 1/00; C12F 3/04
[52] U.S. Cl. .................................... 426/384; 426/14; 426/387; 426/494
[58] Field of Search ................. 426/14, 384, 387, 494, 426/16, 11; 62/532

[56] References Cited

U.S. PATENT DOCUMENTS

| | | | |
|---|---|---|---|
| 1,856,979 | 5/1932 | Todd | 426/387 |
| 2,104,244 | 1/1938 | Ring | 426/494 |
| 3,216,833 | 11/1966 | McKay et al. | 426/387 |
| 3,248,233 | 4/1966 | Brent et al. | 426/387 X |
| 3,404,006 | 10/1968 | Malick | 426/384 X |
| 3,443,961 | 5/1969 | Kaleda et al. | 426/387 X |
| 3,457,082 | 7/1969 | Malick | 426/384 |
| 3,852,477 | 12/1974 | Venter et al. | 426/387 X |

FOREIGN PATENT DOCUMENTS

| | | | |
|---|---|---|---|
| 2314535 | 10/1974 | Fed. Rep. of Germany | 426/11 |
| 17183 | of 1896 | United Kingdom | 426/387 |
| 1381724 | 1/1975 | United Kingdom | 62/532 |

*Primary Examiner*—David M. Naff
*Attorney, Agent, or Firm*—Cushman, Darby & Cushman

[57] ABSTRACT

A process for the concentration of aqueous solutions which in addition to non-volatile components contain alcohol and small amounts of volatile aroma components. First the alcohol and the volatile aroma components are for the greater part separated from the solution by distillation, and condensed; subsequently the remaining aqueous solution is concentrated by freeze concentration; and finally the concentrate thus produced is mixed with said condensate.

4 Claims, 1 Drawing Figure

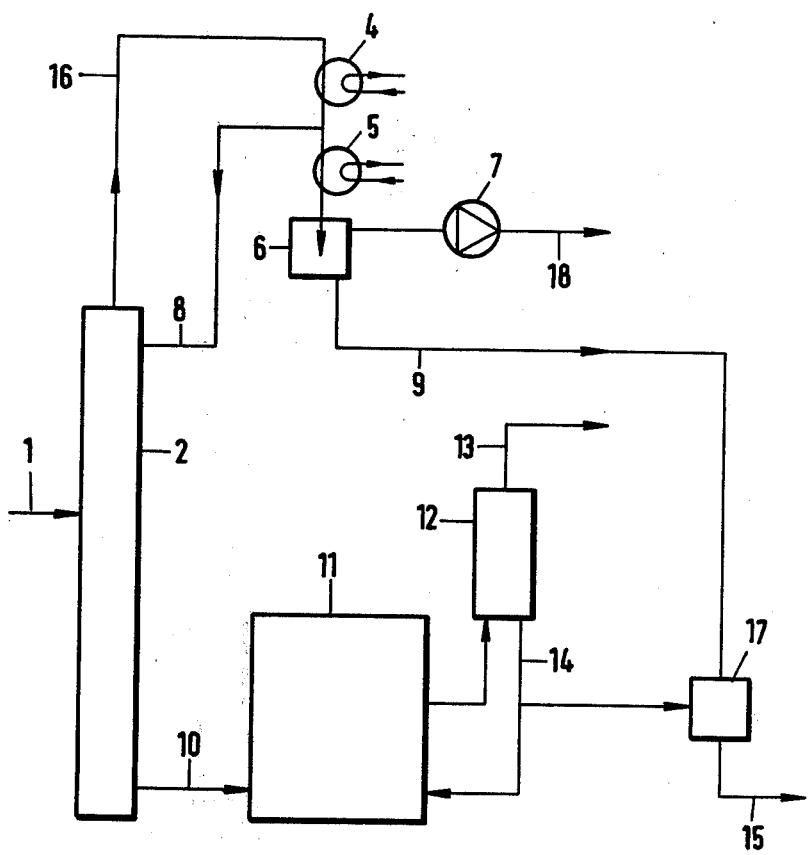

PROCESS FOR CONCENTRATION OF ALCOHOLIC BEVERAGES

This is a continuation of application Ser. No. 885,347 filed Mar. 10, 1978, now abandoned.

This invention relates to a process for the concentration of aqueous solutions, containing besides nonvolatile compounds alcohol and small amounts of volatile aroma components, such as beer and wines, by the selective removal of water. A common process used in these cases is concentration by evaporation. In the evaporation step most of the volatile escape together with the water vapour. These volatiles can be partially returned to the concentrate by either stripping the volatiles from the liquid prior to the evaporate concentration and adding these stripped-off volatiles to the concentrate leaving the evaporator or recovering in a distillation column the volatiles from the vapour escaping from the boiling liquid in the evaporator and adding the distilled concentrate of volatiles to the concentrated liquid. The combination of distillation with concentration by evaporation is widely applied in the food industry. (See e.g. Advances in Food Research, Vol. 20 Academic Press, New York London 1973). However, it always gives concentrates which, after reconstruction, are inferior to the original unconcentrated beverages. This is due to the fact that the volatile aromas are only partially returned in the concentrate.

When the aromas are separated from the liquid in a stripping column, prior to the evaporative concentration, only those volatiles having a volatility in solution which is sufficiently greater than that of water can be separated and recovered. Because part of the aromas of many liquid foods do not satisfy this condition, they will be lost in the subsequent evaporation step.

When the volatiles are separated in a distilllation column from the vapours leaving the boiling liquid in the evaporator, those volatiles having a volatility smaller or only slightly higher than that of water, will be lost. These volatiles leave the distillation column together with the bottoms water stream. Moreover part of the very volatile aromas will escape together with non-condensable gases through the condenser of the stripper or distillation column. Thermal degradation of juices and beverages in the evaporator is also in many cases unavoidable.

Liquid foods can be concentrated without loss of quality in a freeze concentration process. Since water is withdrawn from the aqueous solution by the phase transformation from liquid to ice crystal, aroma losses by evaporation can be completely avoided. Because of the low process temperature, being substantially lower than 0 degrees centrigrade, thermal degradation of the heat labile constituents is also avoided. If the ice crystals grown in the freezing solution are sufficiently large, not smaller than about 100 micrometer in diameter, the concentrated solution can be effectively separated from the ice crystals in wash columns. Solute losses in properly operated wash-columns are well below 0.1 weight percent of the solute in the feed.

In concentrating alcoholic beverages such as wines and beer the limiting factor for the maximum degree of concentration is the alcohol. Under crystallization (freezing) conditions an increase in ethanol concentration results in a progressively decreasing freezing temperature and in a progressively increasing viscosity. Above about 40 weight percent alcohol the alcohol concentration becomes economically prohibitive for the freeze concentration process.

The effect of the concentration factor, which the ratio of the weight of the initial solution to the weight of the concentration solution containing the same weight of solute, upon the freezing temperature is given in table 1.

TABLE 1

Effect of concentration factor on freezing temperature in a model solution of wine. Initial alcohol concentration is 10 weight percent. Initial concentration of dissolved solids is 3 weight percent.

| Concentration-factor | Lowering of freezing temp. Due to dissolved solids °C. | Due to ethanol °C. | Freezing temp. of concentrate °C. |
|---|---|---|---|
| 1 | 0.4 | 5 | −5.4 |
| 2 | 0.6 | 11 | −11.6 |
| 3 | 1.0 | 19 | −20.0 |
| 4 | 1.4 | 27 | −28.4 |
| 5 | 1.8 | 35 | −36.8 |
| 6 | 2.4 | 44 | −46.4 |

As can be seen from table 1, the effect of the increase in the concentration of dissolved solids in the wine on the lowering of the freezing temperature is almost negligible, compared with the lowering of the freezing point due to the corresponding increase in alcohol content. One aspect of the freeze concentration of aqueous solutions containing alcohol at very low freezing temperatures is the high viscosity of the solution which results in very low ice crystal growth rates and consequently low ice-production capacity of the crystallizer. The viscosity of a four-fold concentrated wine is much higher than that of the same concentrate that has been concentrated after removal of the alcohol by distillation.

An even greater drawback is the strong increase in energy costs per unit weight of ice (water) removal with decreasing temperature. The heat of crystallization is always withdrawn indirectly by means of a heat pump (cooling takes place by evaporation of a refrigerant such as freon and subsequent compression and condensation of the vapour). The energy consumption per Joule of heat removed is proportional to the temperature difference between the condensing and evaporating refrigerant. For a refrigerant vapour condensing at +5 degrees centigrade and a temperature difference between the evaporating refrigerant and the crystallizing solution of 10 degrees centigrade, table 2 shows the effect of the concentration factor on the energy consumption of an alcohol containing model solution of wine related to the energy consumption of an alcohol free solution.

TABLE 2

Effect of concentration factor on relative energy consumption of the crystallizer in the freeze concentration of model solutions of wines with and without alcohol.

| Concentration factor | Temperature difference between condensing and evaporating refrigerant °C. | | Ratio between energy consumption with and without alcohol in the freeze concentration step |
|---|---|---|---|
| | without alcohol | with alcohol | |
| 2 | 15.6 | 26.6 | 1.7 |
| 3 | 16.0 | 35.0 | 2.2 |
| 4 | 16.4 | 43.4 | 2.6 |
| 5 | 16.8 | 51.8 | 3.1 |

TABLE 2-continued

Effect of concentration factor on relative energy consumption of the crystallizer in the freeze concentration of model solutions of wines with and without alcohol.

| Concentration factor | Temperature difference between condensing and evaporating refrigerant °C. | | Ratio between energy consumption with and without alcohol in the freeze concentration step |
|---|---|---|---|
| | without alcohol | with alcohol | |
| 6 | 17.8 | 61.4 | 3.5 |

The inventive concept of the present invention is that, for alcoholic beverages, it solves the problem of the negative effect of an increasing alcohol concentration in the freeze concentration process on the capacity of the freeze concentration equipment and thus on capital costs and on energy costs by combining two unit operations, viz. distillation and freeze concentration. According to the invention there is provided a process for the concentration of aqueous solutions, containing besides non-volatile components, alcohol and small amounts of volatile aroma components, such as wine and beer, by the selective removal of water, comprising the following steps:

(a) A first step in which the greater part of the alcohol and volatile aroma components are separated by a process of distillation, preferably at strongly reduced pressure, from the bulk of the aqueous solution and in which the vapours obtained by said distillation process are condensed in a condenser.

(b) A second step in which the aqueous solution obtained in step (a), is concentrated by removing water in a process of freeze concentration.

(c) A third step in which the condensate obtained in step (a), is mixed with the concentrate obtained in step (b).

Unlike distillation combined with evaporation, the combination according to the invention of separation of the alcohol from the beverage by distillation, preferably at strongly reduced pressure, prior to removal of water from the beverage by freeze concentration, and freeze concentration, has little or no adverse effect on the quality of the reconstituted beverage. This is caused by the fact that in the process loss of aromas and thermal degradation are minimized.

In the process according to the invention there is no need for a complete separation by distillation between water and volatiles, including alcohol and aromas, because the aroma components that are left in the bottoms product, are retained in the concentrate. It is obvious that in the subsequent freeze concentration process only water is removed.

Losses by aroma components escaping together with noncondensable gases leaving the distillation column can be almost excluded by lowering the temperature of the distillate prior to the separation of the distillate from the noncondensable gases to such a low value that the vapour pressure of the aroma components is negligible. At a temperature of e.g. $-40$ degrees centigrade aroma losses over the top of the distillation column are almost zero.

To avoid thermal degradation of the aroma components it is recommendable in most cases to lower the pressure in the distillation column to such a value that the temperature of the bottoms product does not exceed 40°–50° C. centigrade and the residence time does not exceed approximately 30 minutes.

According to the invention it has been found that nevertheless in some instances undesirable reactions may occur for the following reasons. It takes time before the equilibrium in the distillation column is established for all the aroma compounds. The residence time for some of these components may therefore be too long by which the quality of the product may be adversely influenced. In such cases it is recommendable to "flush" all the aroma components periodically out the distillation column, e.g. about once every 15 to 60 minutes.

Flushing may e.g. be accomplished by operating under zero reflux for some time (e.g. 1 to 3 minutes).

The present invention will now be further illustrated by reference to the accompanying drawing which is a flow sheet of one embodiment of the process of the present invention.

The liquid to be concentrated (1) is fed to the distillation column (2) which operates under reduced pressure. The vapoirs (16), containing almost all of the ethanol and part of the aromas are removed from the top and are condensed in condenser (4). Part of this condensate is refluxed (8) to the top of the distillation column. The remainder, called distillate, is cooled to about $-40$ degrees centigrade in heat exchanger (5). The non-condensables such as air are separated in gas-liquid separator (6) from the distillate. The distillate (9) is drawn off and subsequently mixed in mixer (17) with the freeze concentrated product (14) leaving the wash column (12).

The reduced pressure in the distillation column is maintained at a desired level by means of the vacuum pump (7). Because of the very low temperature, $-40$ degrees centigrade, of the mixture of condensate and inert gases in the separator (6), aroma losses with the vent gases (18) are almost fully avoided. The liquid (10) leaving the bottom of the distillation column is almost free of alcohol, but does not have to be, and in general will not be, free of aromas, that is from the less volatile ones. This liquid is subsequently fed to the freeze crystallizer (11). In this freeze crystallizer the liquid can, depending upon the dissolved solids concentration, be concentrated three to thirty-fold or even higher. In the wash column (12) the liquid is separated from the icy crystals. When the freeze concentration process is operated properly, solute losses with the ice (13), leaving the wash column (12) are negligible.

Distillation columns to be used in the process according to the invention are described e.g. in Advances in Food Research (already referred to). A freeze crystallizer is described e.g. in U.S. Pat. No. 4,004,886 and a wash columns in U.S. Pat. No. 3,777,892 and U.S. Pat. No. 3,872,009.

The present invention will now be further described by way of the following example.

EXAMPLE : SIX-FOLD CONCENTRATION OF WINE.

1000 kilogram per hour of wine containing 10 weight percent ethanol and 3 weight percent dissolved solids was fed to the distillation column (2). The evaporation rate in this distillation column was 330 kilogram per hour. The column contained 10 theoretical plates in the bottom section and 5 in the top section. The diameter was 0.38 meter and the height 3.5 meter.

It was operated at a pressure of 60 mm mercury. From the column 111 kilogram of distillate containing 90 weight percent ethanol was withdrawn from the top. The bottoms stream was almost free of alcohol and amounted to 889 kilogram per hour. The dissolved solids concentration of the bottoms stream was 3.4 weight percent. In the crystallizer this bottoms stream was concentrated 15 fold. The flow rate of concentrate (14) was 60 kilogram per hour and the concentrate contained 50 weight percent of dissolved solids. From the wash column 829 kilogram per hour of ice was removed. The mixture (15) of the distillate (9) and the freeze concentrated dissolved solids (14) amounted to 171 kilogram per hour. It contained 58.5 weight percent ethanol, 17.5 weight percent dissolved solids and 24 weight percent water. The overall concentration factor was a factor 5.85. Aroma losses were practically zero. The column was "flushed" by shutting off the reflux (8) for two minutes every hour.

The total concentrate reconstituted to the original concentration by dilution with water had an odour and taste that could hardly be distinguished from those of a sample of the original feed.

I claim:

1. Process for the concentration of aqueous alcoholic beverage solutions, containing in addition to nonvolatile components, alcohol and small amounts of volatile aroma components by the selective removal of water, comprising the following steps:

(a) a first step in which substantially all of the alcohol and the more volatile aroma components are separated by a process of distillation at strongly reduced pressure, from the bulk of the aqueous solution and in which the vapors containing alcohol and more volatile aroma components obtained by said distillation process are condensed in a condenser, (b) a second step in which the aqueous solution obtained in step (a), is concentrated by removing water in a process of freeze concentration while retaining in the solution the aroma components remaining from step a), and (c) a third step in which the condensate containing alcohol and more volatile aroma components obtained in step (a), is mixed with the concentrate obtained in step (b).

2. Process according to claim 1, wherein the pressure in the distillation process is kept at such values that the temperature of the aqueous solution of said process does not exceed 40-50 degrees centigrade.

3. Process according to claim 1 or claim 2 wherein the step of distillation includes refluxing to produce a stream of reflux liquid and the stream of reflux liquid in the process of distillation is periodically shut off for a short period of time.

4. Process according to claim 3, wherein the stream of reflux liquid in the process of distillation is shut off every 15-60 minutes for a period of 1-3 minutes.

* * * * *